United States Patent Office 3,714,877
Patented Feb. 6, 1973

3,714,877
PHOTOGRAPHIC STILL CAMERA
Rolf Schröder, Baldham-Kolonie, Germany, assignor to
Agfa-Gevaert Aktiengesellschaft, Leverkusen, Germany
Filed May 23, 1972, Ser. No. 256,096
Claims priority, application Germany, May 27, 1971,
P 21 26 279.3; Dec. 17, 1971, P 21 62 705.4
Int. Cl. G03b *1/62, 15/04, 17/42*
U.S. Cl. 95—31 FM                    26 Claims

ABSTRACT OF THE DISCLOSURE

A still camera for use with roll film having a perforation for each film frame employs a film transporting member which is held against rotation by an arresting device in response to completed transport of film by the length of a frame. The arresting device is rigid with a tracking member which is normally biased against the film by a driver wheel to enter an oncoming perforation upon completed transport of the film by the length of a frame whereby the tracking member actuated the arresting device. The latter carries a projection which maintains the camera release in its starting position when the transporting member is free to advance the film. The driver wheel is biased by a first spring against a blocking pawl which can be disengaged in response to movement of camera release from its starting position whereby the spring propels the driven wheel to a position in which a second spring is free to withdraw the tracking member from the adjacent perforation and a gear segment of the driver wheel meshes with a gear on the transporting member so that the latter can rotate the driver wheel back into engagement with the blocking pawl during transport of the film with attendant stressing of the first spring. The driver wheel further serves to open the shutter, to index a socket for a flashcube and/or to actuate an impeller which fires a flash lamp of the flashcube in open position of the shutter.

BACKGROUND OF THE INNVENTION

The present invention relates to photographic apparatus in general, and more particularly to improvements in still cameras for use with photographic roll film having a row of perforations, one for each film frame. Still more particularly, the invention relates to still cameras of the type wherein a tracking member is biased against the film so as to penetrate into an oncoming perforation and to thereby actuate an arresting device which automatically terminates the movement of film transporting mechanism so that the film is arrested at the exact moment when it has been advanced by the length of a frame.

It is already known to provide a still camera with a reciprocable control member which cooperates with the film transporting mechanism and can also actuate the shutter as well as the arresting device and the tracking device. The control member is moved to a cocked position in response to transport of the film by the length of a frame and is free to leave such cocked position in response to movement of the camera release element from its starting position. The control member thereby withdraws the tracking device from the adjacent perforation of photographic film so that the transporting mechanism is again free to transport the film. At the same time, the control member actuates the shutter and simultaneously serves ɔ a double exposure preventing means in that it holds the camera element against renewed depression prior to completed transport of the film by the length of a frame. A drawback of such cameras is that the reciprocable control member occupies too much room and also that it must complete a certain movement before it accumulates sufficient energy to perform its operations, such as the opening of a shutter and withdrawal of the tracking device from the adjacent perforation of roll film.

SUMMARY OF THE INVENTION

An object of the invention is to provide a photographic apparatus with novel and improved means for automatically terminating the transport of film when the film has been advanced by the length of a frame.

Another object of the invention is to provide a still camera with novel means for automatically arresting the film transporting mechanism and for simultaneously performing several additional functions, such as opening a shutter, withdrawal of a film tracking device from the adjacent perforation of roll film, blocking of the camera release against repeated movement to its actuating position, and/or indexing of a socket for a multiple flash bulb holder.

A further object of the invention is to provide a still camera with a novel and improved control member which occupies less room than heretofore known control members and which can be cocked with the exertion of a relatively small force in automatic response to transport of the film.

The improved photographic apparatus is intended for use with photographic roll film having a row of perforations, one for each film frame. The apparatus comprises a housing which accommodates suitable guide means defining an elongated film path, transporting means which preferably includes a rotary member operable to move the film lengthwise along the film path, an arresting device which is movable to and from an operative position in which the arresting device prevents the operation of film transporting means, tracking means which is operatively connected with the arresting device and is movable between an extended position in which the tracking means extends into an oncoming perforation of the film in the film path and the arersting device is moved to its operative position to thereby prevent further transport of film, and a retracted position in which the tracking means is withdrawn from the adjacent perforation so that the transporting means is free to be operated in order to advance the film by the length of a frame, release means which is movable to and from a starting position, control means which includes rotary driver means movable between first and second positions and arranged to move the tracking means to its retracted position in response to movement to the second position, a helical spring or analogous means for biasing the driver means to its second position, blocking means for maintaining the driver means in its first position in the starting position of the release means, and resetting means for automatically returning the driver means to its first position against the opposition of the biasing means in response to operation of the film transporting means.

The resetting means preferably comprises a first gear which is rigid with the rotary member of the film transporting means, and a second gear (preferably a gear segment) which is rigid with the driver means or forms an integral part thereof. The second gear is arranged to move into mesh with the first gear in response to movement of the driver means to its second position, to rotate the driver means back to its first position in response to rotation of the rotary film transporting member during transport of the film by the length of a frame, and to move out of mesh with the first gear when the driver means reassumes its first position.

The driven means further serves to perform at least one additional function, such as opening the shutter during movement from its first to its second position, indexing a rotary socket for a flashcube in response to movement from one to the other position, urging the tracking means against the film in the film path while dwelling in its first position, and/or actuating an impeller for firing of a flash lamp in in response to movement to its second position so that the flash lamp is fired when the shutter opens.

The novel features which are considered as chacteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
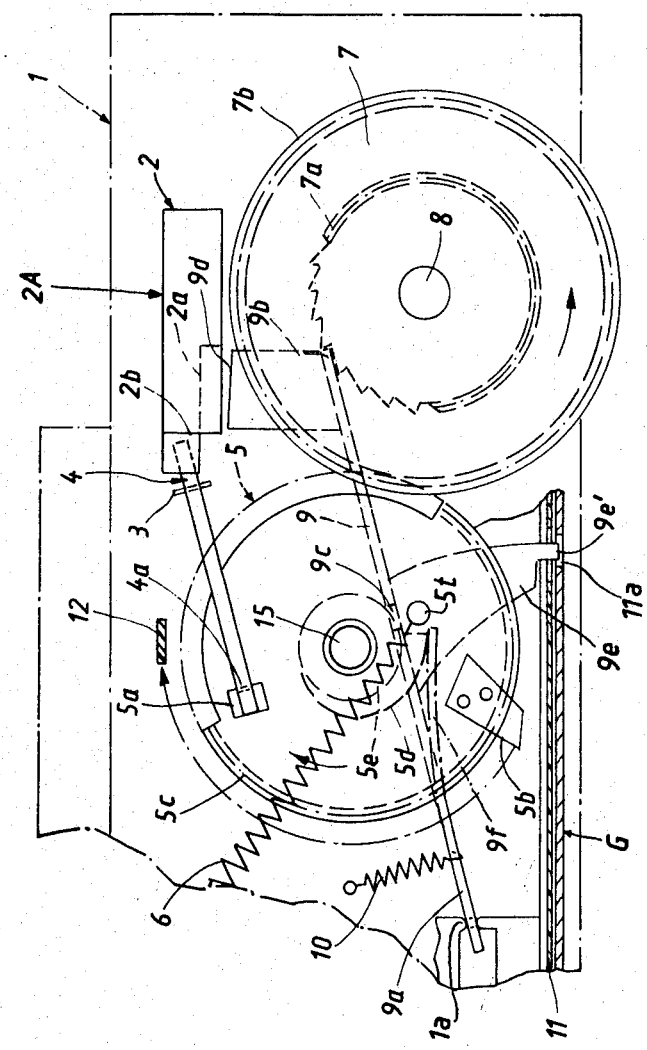
FIG. 1 is an enlarged fragmentary front elevational view of a still camera which embodies the invention.

Referring first to FIG. 1, there is shown a still camera having a housing or body 1. The housing 1 accommodates a film guide 1 which defines an elongated horizontal path for photographic roll film 11. The film 11 has a row of equidistant perforations 11a, one for each of its film frames. The upper portion of the housing 1 supports a camera release element 2 which is movable to and from the illustrated starting position. When the release element 2 is depressed in the direction indicated by the arrow 2A, its cam face 2b engages and pivots the arm of a blocking pawl 4 which is pivotable in the housing 1 about a pin 3. The pallet 4a of the pawl 4 normally extends into the path of a projection 5a provided on a control member here shown as a rotary driver wheel 5 which is mounted in the housing 1 for rotation about a horizontal shaft 15. A suitable spring (not shown) urges the blocking pawl 4 to the position shown in FIG. 1 in which the shorter arm of the pawl 4 is located in the path of the cam face 2b on the release element 2. This release element is further provided with a projection or ledge 2a which is held by a double exposure preventing portion or projection 9d of an arresting device 9 against movement in the direction indicated by arrow 2A when the arresting device 9 assumes the illustrated operative position.

The driver wheel 5 further comprises an arcuate gear segment 5c, a shutter actuating portion or projection 5b, a first cam 5d, and a second cam 5e. A helical spring 6 is connected to an eccentric pin 5t on the driver wheel 5 and serves to bias the wheel in a clockwise direction, as viewed in FIG. 1. The other end of the spring 6 is anchored in the housing 1. The spring 6 stores energy when the projection 5a of the driver wheel 5 abuts against the pallet 4a of the blocking pawl 4.

The camera further comprises a film transporting mechanism which includes a wheel 7 rotatable about the axis of a horizontal shaft 8. The wheel 7 includes a gear 7b which can mesh with the gear segment 5c of the driver wheel 5, and the wheel 7 further comprises a ratchet wheel 7a having an annulus of teeth one of which can be engaged by the right-hand end portion 9b of the arresting device 9 when the latter is caused to assume the operative position of FIG. 1.

The left-hand end portion 9a of the arresting device 9 is pivotable in a knife edge bearing 1a of the camera housing 1. A helical return spring 10 biases a projection or follower 9c of the arresting device 9 against the cam 5e of the driver wheel 5 when the wheel 5 assumes the illustrated first position in which its projection 5a abuts against the pallet 4a of the blocking pawl 4. The arresting device 9 further comprises a leaf spring 9f which can be stressed by the cam 5d of the driver wheel 5 when the wheel 5 assumes the position of FIG. 1. Furthermore, the arresting device 9 is rigid or integral with a film tracking device 9e which is movable between the illustrated extended position in which its tooth 9e' extends into the adjacent perforation 11a of the film 11 and a retracted position in which the tooth 9e' is withdrawn so that the film transporting wheel 7 can advance the film 11 lengthwise in a direction to the right, as viewed in FIG. 1.

The operation:

FIG. 1 illustrates the driver wheel 5 in its first or cocked position in which the spring 6 stores energy and urges the projection 5a against the pallet 4a of the blocking pawl 4. The aforementioned spring urges the shorter arm on the pawl 4 against the cam face 2b of the release element 2 which dwells in the illustrated starting position. It is assumed that the film 11 has been advanced by the length of a frame whereby the tooth 9e' of the tracking device 9e extends into the adjacent perforation 11a so that the arresting device 9 is free to maintain its right-hand end portion 9b in engagement with the adjacent tooth of the ratchet wheel 7a on the rotary film transporting wheel 7. Consequently, the film transporting wheel 7 cannot rotate in a counterclockwise direction in order to advance the film 11 lengthwise. At the same time, the arresting device 9 maintains its double exposure positiventing portion or projection 9d in an inoperative position in which the upper end face of the projection 9d allows the ledge 2a of the release element 2 to descend in response to application of finger pressure in the direction indicated by the arrow 2A. The spring 10 also stores energy but cannot contract because the follower 9c of the arresting device 9 is held by the cam 5e of the driver wheel 5. Furthermore, the cam 5d of the driver wheel 5 engages and flexes the leaf spring 9f so that this spring causes the right-hand end portion 9b of the arresting device 9 to remain in engagement with the adjacent tooth of the ratchet wheel 7a. The spring 9f further maintains the tracking device 9e in the illustrated extended position in which its tooth 9e' extends into the adjacent perforation 11a.

If the user of the camera wishes to make an exposure, the release element 2 is depressed in the direction indicated by the arorw 2A, whereby the cam face 2b of the release element engages and pivots the shorter arm of the blocking pawl 4. The pallet 4a moves away from engagement with the projection 5a so that the spring 6 is free to contract and propels the driver wheel 5 in a clockwise direction, as viewed in FIG. 1. The rotating driver wheel 5 moves the cam 5d beyond the leaf spring 9f so that the spring 10 is free to contract and to disengage the end portion 9b of the arresting device 9 from the ratchet wheel 7a. A the same time, the tooth 9e' of the tracking device 9e is withdrawn from the illustrated perforation 11a so that the film transporting wheel 7 is freed for rotation in a counterclockwise direction in order to transport the film legnthwise. In response to rotation through a predetermined angle, the actuating portion 5b of the driver wheel 5 strikes against a portion 12 of a shutter (not shown in detail) whereby the shutter is moved from a normal or closed position to its open position in order to admit scene light against the foremost unexposed film frame. When the actuating portion 5b advances beyond the shutter portion 12, a suitable spring (not shown) automatically returns the shutter to its closed position so that the admission of scene light is terminated. It is clear that the camera can be provided with a more sophisticated shutter, for example, with a shutter having two or more blades and a suitable retarding mechanism which can maintain the blades in open position for a selected interval of time.

The driver wheel 5 is automatically arrested in a second position when the foremost tooth of its gear segment 5c moves into mesh with the gear 7b on the film transporting wheel 7. The gear 7b and the segment 5c constitute a resetting device which automatically returns the driver wheel 5 to the illustrated first position in response to counterclockwise rotation of the film transporting wheel 7 for the purpose of advancing the film 11 by the length of a frame. The user is free to rotate the wheel 7 because the spring 10 maintains the arresting device 9 out of its operative position and simultaneously maintains the tooth 9e' of the tracking device 9e in retracted position. Such retraction of the device 9e is possible because the cam 5e has been moved beyond the follower 9c on the arresting device 9 and the cam 5d has been moved beyond the leaf spring 9f which normally biases the tooth 9e' against the upper side of the film 11 in the film guide G. When the arresting device 9 is out of its illustrated operative position, the double exposure preventing projection 9d extends into the path of movement of the ledge 2a on the release element 2 so that the release element cannot leave its starting position and cannot cause repeated exposure of the same film frame.

If the user wishes to make a further exposure, it is necessary to advance the film by the length of a frame. Thus, the user must rotate the film transporting wheel 7 in a counterclockwise direction (for example, by resorting to a so-called rapid transport lever such as the lever 107A shown in FIG. 2). While the wheel 7 rotates in a counterclockwise direction, its gear 7b meshes with the segment 5c and rotates the driver wheel 5 in a clockwise direction with attendant stressing of the spring 6. The driver wheel 5 is automatically arrested by the pallet 4a of the blocking pawl 4 when it reassumes the illustrated first position. At such time, the segment 5c has moved out of mesh with the gear 7b so that the operative connection between the wheels 7 and 5 is terminated. The spring 6 has two neutral positions one of which is assumes during movement of the driver wheel 5 from the illustrated first position toward the second position and the other of which the spring 6 assumes during movement of the driver wheel 5 from the second position back to the illustrated first position. The gear segment 5c can move out of mesh with the gear 7b before the wheel 7 is arrested so that the spring 6, which stores energy during rotation of the driver wheel 5 with the wheel 7 of the film transporting mechanism, is free to expand to a certain extent which is necessary to move the projection 5a all the way into engagement with the pallet 4a.

While the driver gear 5 rotates in a clockwise direction back toward its first position which is shown in FIG. 1, the cam 5d gradually stresses the leaf spring 9f so that the spring 9f urges the tooth 9e' of the tracking device 9e against the upper side of the film 11 which is in motion because the wheel 7 rotates in a counterclockwise direction. As soon as the oncoming perforation 11a of the film 11 reaches the tooth 9e', the latter penetrates into such perforation under the action of the spring 9f whereby the tracking device 9e assumes the illustrated extended position and causes the end portion 9b of the arresting device 9 to engage the adjacent tooth of the ratchet wheel 7a. Consequently, the wheel 7 is arrested and cannot cause further transport of the film 11. The wheel 7 is arrested at the exact moment when the transport of film 11 by the length of a frame is completed. The follower 9c of the arresting device 9 is engaged by the cam 5e of the driver wheel 5 when the latter returns to the first position of FIG. 1, whereby the arresting device 9 is positively held in the operative position. Such return movement of the device 9 to its operative position results in downward movement of the double exposure preventing projection 9d so that the release element 2 is freed for movement in the direction indicated by the arrow 2A and the camera is ready for the making of an exposure.

It is clear that the camera of FIG. 1 is susceptible of many modifications. For example, the tracking device 9e can be mounted for pivotal movement about its own axis and can be operatively connected with the arresting device 9 by mans of springs or the like. Also, the arresting device 9 and the tracking device 9e can constitute two arms of a lever which is pivotable in the housing 1 between a first position in which the arresting device assumes the illustrated operative position and the tracking device assumes the illustrated extended position, and a second position in which the arresting device is disengaged from the ratchet wheel 7a and the tooth 9e' of the tracking device 9 is retracted from the adjacent perforation 11a. If the tracking device 9e constitutes a lever, it can be engaged or biased by two helical or leaf springs acting in opposite directions. Furthermore, the actuating portion 5b of the driver wheel 5 need not directly engage a portion of the shutter in a manner as shown in FIG. 1. For example, the actuating portion 5b of the driver wheel 5 can constitute an impeller which strikes against a member capable of releasing the shutter for movement to its open position. Still further, the actuating portion 5b can constitute a blocking element for a cocked impeller (not shown) which latter is free to strike against one or more shutter blades and to open the shutter in response to movement of the driver wheel 5 to its second position.

The driver wheel 5 replaces the aforementioned reciprocable control member which is used in conventional cameras to prevent double exposure of film, to open the shutter, to index the socket for a flashcube, and/or to perform other functions. An advantage of the driver wheel 5 is that it occupies much less room than a reciprocable control member. Furthermore, the driver wheel 5 can be made of a synthetic plastic material so that its inertia is negligible and that it can be rapidly accelerated by the spring 6 to a speed which is necessary to open the shutter. Not only the driver wheel 5 but also many other illustrated components of the still camera can be made of synthetic plastic material to reduce the overall weight and cost of the apparatus. Such components include the arresting device 9, the tracking device 9e, the blocking pawl 4, the release element 2 and at least a portion of the film transporting mechanism.

It will be noted that the driver wheel 5 rotates in a single direction (clockwise, as viewed in FIG. 1) under or against the action of the spring 6. Thus, when the spring 6 is free to propel the driver wheel 5 from the illustrated first position, the wheel rotates clockwise through approximately 180° whereby the spring 6 dissipates its energy. The dissipation of energy is sufficient to enable the gear 7b to automatically arrest the driver wheel 5 when one of its teeth is engaged by the foremost tooth of the gear segment 5c. The spring 6 begins to store energy when the wheel 7 rotates counterclockwise to advance the film 11 in a direction to the right, as viewed in FIG. 1, and to simultaneously rotate the driver wheel 5, again in a clockwise direction, until the projection 5a returns into abutment with the pallet 4a or until the tooth 9e' of the tracking device 9e penetrates into the oncoming perforation 11a so as to allow the arresting device 9 to reassume its operative position.

Figure 2:
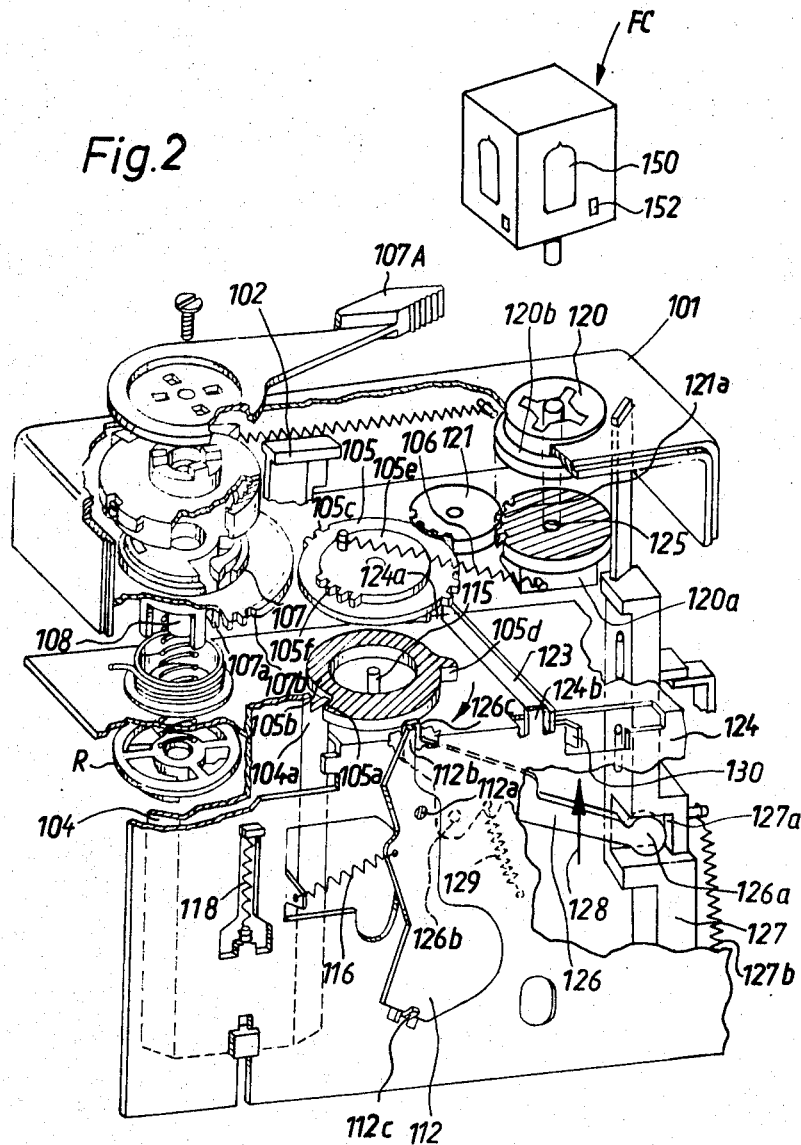
FIG. 2 is an exploded fragmentary perspective view of a modified still camera.

FIG. 2 illusrates a portion of a second still camera which constitutes a modification and a further development of the camera shown in FIG. 1. The second camera comprises a housing or body 101 which accommodates a film transporting mechanism including a film transporting wheel 107 adapted to receive motion from a rapid transport lever 107A mounted at the outer side of the top wall of the housing 101. The lever 107A is adjacent to the exposed upper end of a camera release element 102 which is illustrated in its starting position. When the release element 102 is depressed, it entrains a blocking member 104 which is a functional equivalent of the pawl 4 shown in FIG. 1. The blocking member 104 is coupled to the release element 102 by a helical spring 118. In the embodiment of FIG. 2, the blocking member 104 is reciprocable between its operative and disengaged positions; however, it is equally possible to replace this blocking member with a pivotable pawl or analogous blocking means. When the release element 102 assumes the illustrated starting position, the spring 118 maintains the blocking member 104 in a blocking position in which a projection or tooth 104a of the blocking member extends into the path of and engages with a projection 105a of a control member here shown as a rotary driver wheel 105. The driver wheel 105 is biased by a helical spring 106 in the same way as the wheel 5 of FIG. 1 is biased by the spring 6. Thus, the spring 106 stores energy when the projections 105a of the driver wheel 105 engages with the projection 104a of the blocking member 104. The spring 106 tends to rotate the driver wheel 105 in a clockwise direction, as viewed in FIG. 2. This driver wheel is rotatable about the axis of a vertical shaft 115 mounted in the housing 101. The driver wheel 105 further comprises a shutter actuating portion 105b having a projection 105d, a gear segment 105c which corresponds to the gear segment 5c of FIG. 1, and a further gear segment 105f which is angularly offset relative to the gear segment 105c and forms part of a gear train serving to index a socket 120 for a multiple flashbulb holder FC of the type known as flashcube.

The camera of FIG. 2 further comprises a simple shutter having a blade 112 which is pivotable in the housing 101 about a pin 112a and is biased to its closed position by a helical spring 116. A projection 112b of the blade 112 extends into the path of movement of the projection 105d on the actuating portion 105b of the driver wheel 105 when the driver wheel dwells in the illustrated first position in which the spring 106 stores energy.

The film transporting mechanism further includes a ratchet wheel 107a which is rigid with the wheel 107 and can be engaged by an arresting device (not shown) similar to that shown at 9 in FIG. 1. The shaft for the wheel 107 and ratchet wheel 107a is shown at 108. The wheel 107 is integral or rigid with a gear 107b which can move into mesh with the gear segment 105c of the driver wheel 105 when the latter assumes its second position at an angle of about 180° relative to the position shown in FIG. 2. The tracking device (corresponding to the device 9e of FIG. 1) is not shown in FIG. 2. The operation and mounting of the tracking device, as well as of the aforementioned arresting device, are the same as described in connection with FIG. 1, i.e., the two devices receive motion from a spring (corresponding to the spring 10 of FIG. 1) or from the driver wheel 105. A portion of the film takeup spool or reel for photographic row films is shown at R. This spool rotates in response to rotation of the wheel 107 in a clockwise direction, as viewed in FIG. 2.

Since the driver wheel 105 is shown in its first position in which the spring 106 stores energy, the tooth of the tracking device is assumed to extend into the adjacent perforation of photographic film and the arresting device is assumed to engage one tooth of the ratchet wheel 107a so that the wheel 107 cannot be rotated by lever 107a in a direction to transport the film lengthwise. Therefore, the foremost film frame is assumed to be located behind the opening which is normally concealed by the shutter blade 112. The release element 102 dwells in its starting position and the projection 104a of the blocking member 104 engages the projection 105a of the driver wheel 105. If the user wishes to make an exposure, the release element 102 is depressed whereby the spring 118 entrains the blocking member 104 and withdraws the projection 104a from the path of the projection 105a. Therefore, the driver wheel 105 is free to rotate in a clockwise direction, as viewed in FIG. 2, and the projection 105d of its actuating portion 105b strikes against the projection 112b of the blade 112 so that the blade is pivoted counterclockwise, as viewed in FIG. 2, and assumes its open position against the opposition of the spring 116. As soon as the projection 105d of the actuating portion 105b moves beyond the projection 112b, the spring 116 is free to contract and to return the blade 112 to its closed position. As mentioned in connection with FIG. 1, the camera can be provided with a more sophisticated shutter having two or more blades and a suitable retarding mechanism which can be adjusted so as to enable the shutter to furnish any desired number of exposure times.

As the driver wheel 105 continues to rotate in a clockwise direction under the action of the spring 106, its segment 105c moves into mesh with the gear 107b of the film transporting reel 107 so that the driver wheel is arrested in its second position. The segment 105c moves into mesh with the gear 107b at a time when the arresting device (not shown in FIG. 2) has released the ratchet wheel 107a so that the film transporting mechanism is free to transport the film lengthwise. At the same time, a double exposure preventing projection (corresponding to the projection 9d of FIG. 1) prevents renewed depression of the release element 102 prior to completed transport of film by the length of a frame.

Prior to making the next exposure, the user must actuate the rapid transport lever 107A in a direction to advance the film by the length of a frame, i.e., to rotate the takeup reel or spool R in a direction to collect the film. As the lever 107A rotates the wheel 107, the gear 107b rotates the driver wheel 105 by way of the segment 105c whereby the spring 106 stores energy while the wheel 105 returns to the illustrated first position. Further rotation of the wheel 107 is prevented when the ratchet wheel 107a is reengaged by the arresting device, namely, when the tooth of the tracking device (not shown in FIG. 2) is free to penetrate into the on-coming perforation of the film. At the same time, the double exposure preventing projection of the arresting device moves out of the way of the release element 102 so that the camera is ready to make the next exposure.

The driver wheel 105 is integral or rigidly connected with a disk 105e which is provided with the aforementioned gear segment 105f. The gear segment 105c is coaxial with the gear segment 105f and can form part of a separate disk which is rigid with the disk 105e.

The aforementioned gear train between the driver wheel 105 and the socket 120 further comprises an intermediate gear 121 which is rotatably mounted in the housing 101 and a gear 121a which is rigid with the socket 120. This socket is rotatable about the axis of a shaft 125. The angular position of the segment 105f is preferably selected in such a way that the gear 121 rotates the socket 120 while the driver wheel 105 rotates with the wheel 107 of the film transporting mechanism.

In order to reduce the cost of the camera, it is preferred to construct many of its components of inexpensive material, such as a suitable synthetic plastic substance. The mass production of such plastic parts cannot be carried out with such degree of accuracy that the segment 105f of the driver gear 105 would invariably move into mesh with the intermediate gear 121 when the driver wheel 105 assumes its second position, namely, when the gear segment 105c moves into mesh with the gear 107b of the film transporting mechanism. In order to reduce the cost of the camera by assembling it of relatively simple parts which need not be manufactured with a high degree of precision, the intermediate gear 121 is preferably provided with at least one recess (missing tooth) which is positioned in such a way that it is adjacent to the foremost tooth of the gear segment 105f when this gear segment approaches the intermediate gear 121 while the driver wheel 105 rotates toward its second position under the action of the spring 106. The provision of one or more missing teeth on the intermediate gear 121 positively prevents any jamming or clashing of teeth when the driver wheel 105 approaches its second position. The transmission ratio of the gear train 105f, 121, 121a is such that the socket 120 is rotated through 90° in response to rotation of the driver wheel 105 from its second back to its first position. This is desirable because the commercially available flashcubes normally comprise four equidistant flash lamps. In such cameras, the intermediate gear 121 will be provided with four missing teeth or recesses and the gear segment 105f will extend along an arc of approximately 180°.

The innermost portion of the socket 120 has a square outline, as at 120a, and is engaged by a detent spring 123 which insures that the socket 120 invariably assumes one of its four predetermined positions in each of which a different flash lamp of the flashcube FC faces the subject. The ends of the spring 123 abut against two projections or lugs 124a, 124b of an internal partition or wall 124 of the housing 101. The spring 123 is mounted in an at least slightly prestressed condition so that it normally lies flat against the adjacent side of the square portion 120a to thus insure that the socket 120 remains in one of its four predetermined positions. The shaft 125 for the socket 120 is riveted or otherwise secured to the frame member 124. A collar 120b of the socket 120 abuts against the inner side of the top wall of the housing 101.

The illustrated flashcube FC has four flash lamps 150 each of which is located in front of a suitable reflector. Each flash lamp 150 is associated with a firing device 152 which is capable of firing the respective lamp in response to reception of an impact. For example, each firing device 152 may comprise a piezoelectric crystal which produces a high voltage surge in response to reception of a blow. A reciprocable impeller which can strike against adjacent firing devices 152 is shown at 127. This impeller is coupled to a motion transmitting lever 126 by means of a ball and socket coupling 126a, 127a and is biased downwardly, as viewed in FIG. 2, by a helical spring 127b. The lever 126 is pivoted at 126b and has a projection 126c which is immediately adjacent to the projection 112b of the shutter blade 112 when the blade 112 dwells in the closed position shown in FIG. 2. The projections 112b, 126c then extend into the path of movement of the projection 105d on the actuating portion 105b. Thus, when the user depresses the release element 102 and the driver wheel 105 is free to rotate under the action of the spring 106, the projection 105d strikes against the projections 112b and 126c whereby the lever 126 pivots counterclockwise, as viewed in FIG. 2, against the opposition of a weak spring 129 and propels the impeller 127 upwardly (see the arrow 128) against the opposition of the spring 127b. The upper end portion of the impeller 127 strikes against the adjacent firing device 152 and causes the firing of that flash lamp 150 which faces the subject. The springs 129 and 127b thereupon cooperate to return the impeller 127 and the motion transmitting lever 126 to the positions shown in FIG. 2. The reference character 130 denotes an abutment on the wall 124 against which a second projection 112c of the shutter blade 112 strikes when the blade 112 assumes its fully opened position. The blade 112 thereupon rebounds in response to impact of the projection 112c against the abutment 130 to thus facilitate the action of the spring 116 which draws the blade 112 to its closed position.

The camera of FIG. 2 is susceptible of many additional modifications. For example, the intermediate gear 121 of the gear train which rotates the socket 120 can be omitted if the number of teeth on the gear segment 105f and gear 121a is selected in such a way that the driver wheel 105 can directly index the socket 120. It is also possible to replace the segments 105c, 105f with a disk having two segmental gear portions one of which can mesh with the gear 107b while the other meshes directly with the gear 121a or with the intermediate gear 121. Also, the camera of FIG. 2 may comprise a disk which can rotate relative to the driver wheel 105 and has a first segment in mesh with the segment 105c and the second segment in mesh with the gear 121a. The first segment moves out of mesh with the segment 105c when the other segment moves into mesh with the gear 121a or vice versa. It is further clear that the flashcube FC can be replaced with a conventional flashcube which does not have any firing devices, i.e., wherein the flash lamps 150 can be fired in response to completion of an electric circuit including a source of electrical energy in the housing of the camera.

The driver wheel 105, the socket 120 and at least a portion of the film transporting mechanism may be made of a suitable synthetic plastic material.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a camera for use with roll film having a row of perforations, one for each film frame, the combination of guide means defining a film path; transporting means operable to move the film lengthwise along said path; an arresting device movable to and from an operative position in which said device prevents the operation of said transporting means; tracking means operatively connected with said arresting device and movable between an extended position in which said tracking means extends into an oncoming perforation of the film in said path and said arresting device is moved to said operative position to prevent further transport of film, and a retracted position in which said tracking means is withdrawn from the adjacent perforation so that the transporting means can be operated to advance the film by the length of a frame; release means movable to and from a starting position; control means including driver means rotatable between first and second positions and arranged to move said tracking means to said retracted position in response to movement to said second position; means for biasing said driver means to said second position; blocking means for maintaining said driver means in said first position in the starting position of said release means; and resetting means for returning said driver means to said first position against the opposition of said biasing means in response to operation of said transporting means.

2. The combination of claim 1, further comprising double exposure preventing means for maintaining said release means in said starting position in the retracted position of said tracking means.

3. The combination of claim 1, wherein said transporting means comprises a rotary member and said resetting means comprises a first gear on said rotary member and a second gear on said driver means, said second gear being arranged to move into mesh with said first gear in response to movement of said driver means to said second position, to rotate said driver means back to said first position in response to rotation of said rotary member during transport of the film by the length of a frame, and to move out of mesh with said first gear when said driver means reassumes said first position.

4. The combination of claim 3, wherein one of said gears is a gear segment.

5. The combination of claim 1, further comprising shutter means movable between open and closed positions and actuating means for moving said shutter means to said open position in response to movement of said driver means to said second position.

6. The combination of claim 1, further comprising a source of artificial light including an element indexible between a plurality of positions and means for indexing said element in response to movement of said driver means from one to the other position thereof.

7. The combination of claim 6, wherein said element is a socket which is indexible about a predetermined axis and said source further comprises a multiple flash lamp holder separably connected to and indexible with said socket.

8. The combination of claim 1, wherein said driver means is rotatable in a single direction about a predetermined axis to stress said biasing means during movement from said second to said first position, said biasing means being free to dissipate energy and to thereby rotate said driver means from said first to said second position in response to movement of said release means from said starting position to thus disengage said blocking means from said driver means.

9. The combination of claim 8, wherein said biasing means comprises a helical spring having two neutral positions one of which said spring assumes during movement of said driver means from said first to said second position and the other of which said spring assumes during movement of said driver means from said second back to said first position.

10. The combination of claim 1, wherein said tracking means is rigid with said arresting device and further comprising resilient means for biasing said tracking means to said retracted position.

11. The combination of claim 10, further comprising means for urging said tracking means against the film in said path in the first position of said driver means with attendant stressing of said resilient means.

12. The combination of claim 11, wherein said means for urging said tracking means against the film in said path includes a cam provided on said driver means and an elastic follower connected with said tracking means and being engaged by said cam in the first position of said driver means.

13. The combination of claim 12, wherein said elastic follower is a leaf spring.

14. The combination of claim 1, wherein said arresting device comprises a double exposure preventing portion which prevents the movement of said release means from said starting position when said arresting device is out of said operative position.

15. The combination of claim 1, further comprising shutter means movable to and from an open position, said driver means comprising a portion arranged to move said shutter means to said open position in response to movement of said driver means from said first to said second position.

16. The combination of claim 1, further comprising a source of artificial light including a socket indexible about a predetermined axis and a gear train receiving torque from said driver means and arranged to index said socket about said axis in response to movement of said driver means from one to the other position thereof.

17. The combination of claim 16, wherein said transporting means comprises a rotary member which rotates in a predetermined direction during transport of the film by the length of a frame, said resetting means comprising a first gear connected with said rotary member and a second gear provided on said driver means and receiving torque from said first gear during rotation of said rotary member to thereby move said driver means from said second to said first position, said gear train comprising a third gear connected with said driver means and a fourth gear provided on said socket, said fourth gear receiving torque from said third gear while said driver means rotates from said one to said other position thereof.

18. The combination of claim 17, wherein said third gear is a gear segment.

19. The combination of claim 18, wherein said second gear is a gear segment rigid with said first mentioned segment.

20. The combination of claim 17, wherein said second and third gears are segments which are angularly offset relative to each other with respect to the axis of said driver means.

21. The combination of claim 17, wherein said third gear is a segment and said gear train further comprises an intermediate gear meshing with said fourth gear and receiving torque from said third gear in response to rotation of said driver means from said one to said other position.

22. The combination of claim 21, wherein said intermediate gear has a missing tooth in the region of the foremost tooth of said segment in the one position of said driver means to facilitate the intermeshing of said segment and said intermediate gear in response to movement of said driver means from said one position.

23. The combination of claim 1, further comprising a source of artificial light including at least one flash lamp and impact responsive firing means for said lamp, shutter means movable between open and closed positions, actuating means for moving said shutter means to said open position in response to movement of said driver means to said second position, and impeller means for transmitting to said firing means an impact in response to opening of said shutter means.

24. The combination of claim 23, wherein said impeller means receives motion from said actuating means.

25. The combination of claim 23, wherein said source further comprises a socket indexible between a plurality of positions and a multiple flash lamp holder separably connected to and indexible with said socket, said holder having a plurality of flash lamps and discrete firing means for each of said flash lamps, and further comprising means for indexing said socket in response to movement of said driver means from one to the other position thereof to thereby place successive firing means into the range of said impeller means.

26. The combination of claim 23, wherein said actuating means comprises a projection provided on said driver means and movable along a predetermined path in response to rotation of said driver means from said first to said second position, said shutter means and said impeller means having closely adjacent portions extending into said predetermined path.

References Cited

UNITED STATES PATENTS

| 3,253,526 | 5/1966 | Steisslinger | 95—31 FM |
| 3,605,595 | 9/1971 | Irwin | 95—31 FL |

ROBERT P. GREINER, Primary Examiner

U.S. Cl. X.R.

95—11 L, 31 FL, 31 AC, 11.5 R; 240—1.3